Feb. 27, 1923.

C. E. WRIGHT 1,447,002

MOTION PICTURE MACHINE

Filed Jan. 31, 1921

INVENTOR.
Clarence E Wright
BY
Harkow
ATTORNEYS.

Feb. 27, 1923.
C. E. WRIGHT
MOTION PICTURE MACHINE
Filed Jan. 31, 1921   2 sheets-sheet 2
1,447,002
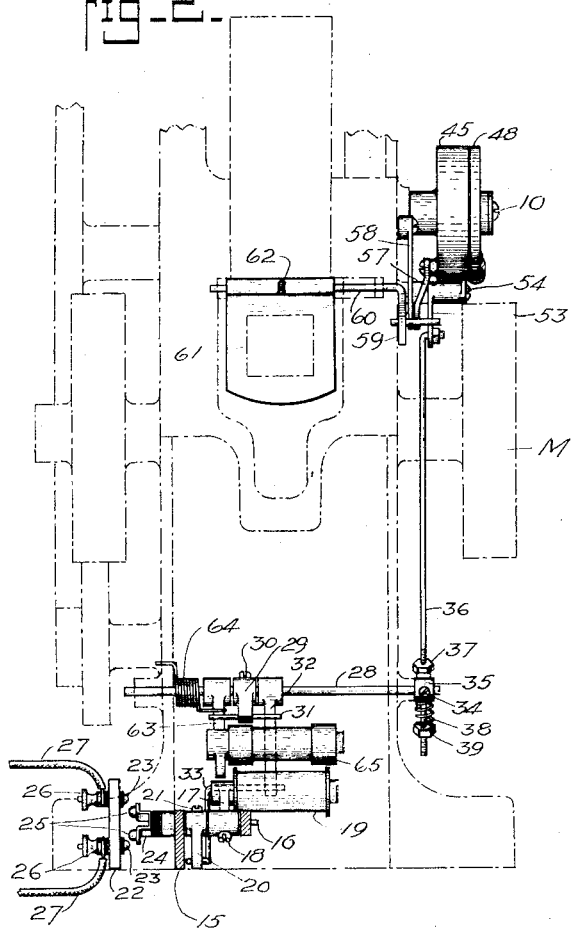
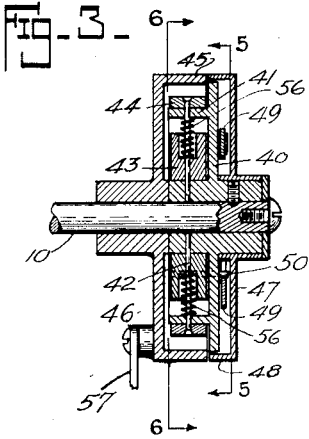
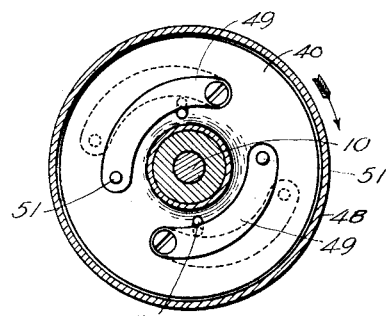
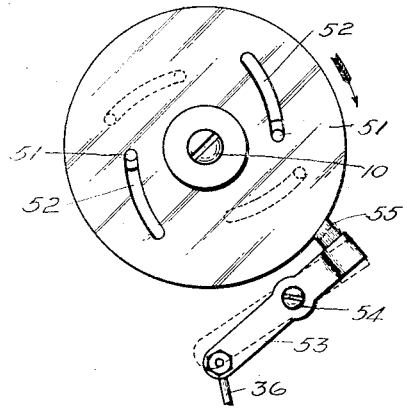
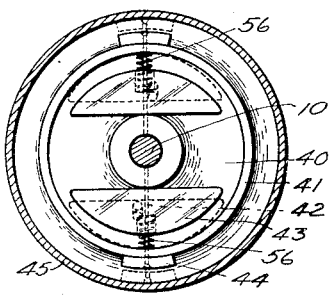
INVENTOR.
Clarence E. Wright
BY
J. H. Clarkson
ATTORNEYS.

Patented Feb. 27, 1923.

1,447,002

UNITED STATES PATENT OFFICE.

CLARENCE E. WRIGHT, OF LOUISVILLE, KENTUCKY.

MOTION-PICTURE MACHINE.

Application filed January 31, 1921. Serial No. 441,134.

*To all whom it may concern:*

Be it known that I, CLARENCE E. WRIGHT, a citizen of the United States, residing at Louisville, in the county of Jefferson and State of Kentucky, have invented certain new and useful Improvements in Motion-Picture Machines, of which the following is a specification.

This invention relates to electrically operated motion picture machines and has special reference to an automatic shutter closer and circuit breaker for machines of that description.

One important object of the invention is to improve the general construction of devices of this character.

A second important object of the invention is to provide a novel arrangement of circuit breaker which will operate to break the electrical circuit through the machine upon breakage of or too great relaxation of the tension on the film.

A third important object of the invention is to provide a novel form of automatic shutter closing device which will operate upon breakage of or too great relaxation of the tension of the film.

A fourth important object of the invention is to provide a novel arrangement for causing the circuit breaker and shutter closing devices to work in immediate sequence.

A fifth important object of the invention is to provide a novel arrangement whereby the electrical circuit through the machine will be broken whenever too great tension is exerted on that part of the film which is ordinarily slack and is located below the shutter.

A sixth important object of the invention is to provide in connection with the circuit breaker a shutter closing mechanism which will also operate when the tension on the slack part of the film above noted becomes too great.

With the above and other objects in view the invention consists in general of certain novel combinations of parts and arrangements of details hereinafter fully described, illustrated in the accompanying drawings, and specifically set forth in the claims.

In the accompanying drawings like characters of reference indicate like parts in the several views, and:—

Figure 1 is a side elevation of the improved device mounted upon a motion picture machine, the motion picture machine itself being partly shown in dash and dot lines while the device is shown with the circuit closed and the shutter open in full lines and with the circuit open and shutter closed in dotted lines.

Figure 2 is a front view of the parts shown in Figure 1, the device being shown in full lines and the motion picture machine being shown in dash and dot lines.

Figure 3 is a section taken diametrically through a circuit clutch mechanism used in connection herewith.

Figure 4 is a side elevation of this clutch with the brake lever shown in braking position in full lines and in release position in dotted lines.

Figure 5 is a section on the line 5—5 of Figure 3.

Figure 6 is a section on the line 6—6 of Figure 3.

Figures 7 and 8 are detail views of the brake mechanism.

The motion picture machine itself is indicated in general at M and it is not deemed necessary in this specification to describe the greatest details which are shown of this machine since many types of motion picture machines may be used in connection with the improved device. However, the type of the machine to which this device is peculiarly adaptable is provided with a drive shaft 10 connected by gearing, not shown, with the operating crank 11 so that rotation of this crank rotates the drive shaft 10. Also in such a machine there is provided a lower feed sprocket 12 and a guide sprocket 13 over which passes the film 14, this film being slack as shown in Figure 1 between these two sprockets.

The device itself includes a bracket 15 mounted suitably on the machine M and journaled in this bracket 15 is a shaft 16 whereon is mounted a lever 17 which is fixed on the shaft by means of a suitable set screw 18. This lever projects upwardly from the shaft and carries a film guide roller 19. There is also mounted on the shaft 16 a lever or arm 20 which is fixed to the shaft by a set screw 21. Supported adjacent the bracket 15 is a bracket 22 carrying contacts 23 and fixed on the shaft 16 is a conducting strip 24 carrying contacts 25. The contacts 23 and conducting strip 24 are insulated from the adjacent parts as shown and connected to the contacts 23 electrically are binding posts 26 which form means for the connection of the circuit wires 27. The arrangement of these parts is such that with the lever 17 in the position shown in full lines in Figure 1 the contacts 23 will engage the contacts 25 and accordingly current can flow from one wire 27 to the other. When, however, the lever 17 assumes the dotted line position in Figure 1 the contacts 25 will be out of engagement with the contacts 23 and consequently the circuit will be broken. Under these circumstances it will be plain that so long as the film 14 is kept under tension and in the position shown in Figure 1 the circuit will be closed. If this film breaks between the sprocket 13 and the receiving reel (not shown) the lever 17 will drop to the dotted line position and consequently the contact will be broken.

At 28 is a shaft whereon is fixed a rock arm 29 secured to the shaft by a set screw 30. Through the free end of this rock arm extends a cross pin 31. Pivotally mounted on the shaft 28 is a rock arm 32 which is connected by a link 33 with the arm 20. Normally the rock arm 32 is out of contact with the cross pin 31 but whenever the arm 17 drops the arm 20 will move to draw upon the link 33 and thus cause the rock arm 32 to move into engagement with the pin 31 and thereby affect movement of the rock arm 29 to the position shown in dotted lines in Figure 1. As a consequence this will rotate the shaft 28. Fixed on the shaft 28 by a set screw 34 is a rock arm 35 having an opening in its free end through which passes a connecting rod or link 36. Above the rock arm 35 is located a limit stop in the form of a nut 37 while below said rock arm a spring 38 is arranged around the link 36, being given the proper compression by means of a nut 39 on the lower end of said link. Thus downward motion of the rock arm 35 is against the spring 38 so that there is a yieldable connection between the link 36 and said rock arm. This is for the purpose of permitting lost motion between the rocker arm 35 and the link 36 so that a limited movement of the parts may take place without full operation of the device as will be apparent from what follows. It will be noted also that this construction constitutes a resiliently yieldable lost motion device.

Fixed upon the shaft 10 is a disk 40 having a circular flange 41 projecting inwardly therefrom in spaced relation to its periphery. This flange is provided with suitable openings for the reception of guide pins 42, the hub of the disk 40 having likewise suitable openings to guide the inner ends of these pins. Fixed on each of the pins 42 is a weight 43 which is connected by the respective pin with a brake member 44 operating on the outwardly extending flange 45 of a disk 46 mounted revolubly on the shaft 10. The hub of the disk 40 extends outwardly and on this outwardly extending portion is mounted a brake disk 47 having an inwardly extending peripheral brake flange 48. Pivoted to the outer side of the disk 40 is a pair of curved levers 49 and said disk is slotted to receive pins 50 fixed in the weights 43 and projecting through the disk 40 so that they may be engaged by the levers 49. The levers 49 are also provided with outwardly extending pins 51, the outer ends of said pins engaging in cam slots 52 formed in the brake disk 47. The upper end of the connecting rod or link 36 is connected to one arm of a brake lever 53 pivoted at 54 intermediate its ends. The other end of this brake lever carries a brake shoe 55 which is engageable with the brake flange 48 of the disk 47. Under ordinary conditions of operation when the circuit is closed the brake shoe 55 will be out of contact with the brake flange 48. In such conditions the revolution of the shaft 10 in the direction shown by the arrows in Figures 1, 4 and 5 will cause, through centrifugal action, outward movement of the weights 43 against the springs 56, best shown in Figure 3, and thus cause contact of the clutch shoes 44 with the flange 45 thereby tending to rotate the disk 46. This disk 46 has connected thereto one end of a link 57. The other end of this link is supported by a swinging link 58 and engages with a curved rock arm 59 forming part of the shaft 60 carrying the shutter 61. The shutter 61 is also provided with an arm 62 which acts as a stop to limit the upward movement of the shutter as can be seen by reference to Figure 1. Under these conditions the revolution of the shaft 10 will normally hold the shutter raised since the arms 49 will swing to move the pins 51 upward in the slots 52 to permit outward movement of the clutch shoes 44. However, if the film breaks in such manner as to drop the lever 17 then the action of the rock arm 35 will operate to force the brake shoe 55 into engagement with the brake flange 48. This will check the movement of the brake disk 47 and, inasmuch as the disk 40 still revolves, the pins 51 will be forced inwardly by the action of the slots 52 and thereby free the clutch shoes 44 from the flange 45. As a consequence of this the disk 46 will be free to revolve on the shaft 10 and the weight of the shutter 61 will close the shutter to the dotted line position shown in Figure 1.

It has been previously noted that between the sprockets 12 and 13 the film 14 should be left slack. In order to prevent this film from tightening up too much at this point there is provided a curved lever 63 which is freely revoluble on the shaft 28 but which is normally held in the full line position shown in Figure 1 by means of a spring 64. The inner end of the pin 31 lies in the path of this curved lever and on the free end of this lever is a guide roller 65 beneath which the film passes. From an inspection of Figure 1 it may be seen that tightening of the film 14 between the sprockets 12 and 13 to too great an extent will have the effect of moving the lever 63 to the dotted line position. This in turn will act on the rock arm 29 and consequently will effect action of the brake shoe 55 on the brake flange 48 and resultant closure of the shutter.

Thus in the event that the film breaks the circuit is shut off and the shutter closed while in case there is too great tension in the film between the sprockets 12 and 13 the shutter will close.

There has thus been provided a simple and efficient device of the kind described and for the purpose specified.

It is obvious that many minor changes may be made in the form and construction of the invention without departing from the material principles thereof.

It is not therefore desired to confine the invention to the exact form shown and described but it is wished to include all such as properly come within the scope claimed.

Having thus described the invention, what is claimed as new, is:—

1. In a motion picture machine employing a film ribbon and having a shutter; of a clutch mechanism comprising a pair of disks, one of said disks carrying a plurality of clutch shoes, the other disk being provided with a flange with the inner face of which the shoes normally engage to clutch said disks together, a connection between the flanged disk and said shutter, a driving element for rotating the shoe carrying disk, a trip controlled by the tension in the film, and means actuated by the trip and arranged to disengage the clutch shoes from the flange and thereby release the flanged disk and permit the shutter to close.

2. In a motion picture machine employing a film ribbon and having a shutter; of a clutch mechanism comprising a pair of disks, one of said disks carrying a plurality of clutch shoes, the other disk being provided with a flange with the inner face of which the shoes normally engage to clutch said disks together, a connection between the flanged disk and said shutter, a driving element for rotating the shoe carrying disk, a trip controlled by the tension in the film, and means actuated by the trip and arranged to disengage the clutch shoes from the flange and thereby release the flanged disk and permit the shutter to close, said means including a lost motion device whereby minor variations in the tension of said film will be ineffective to release the clutch.

3. In a motion picture machine employing a film ribbon and having a shutter constantly tending to close; a driving shaft, a clutch disk mounted on said shaft to revolve thereon and having a clutch flange, means connecting said disk and shutter, a second clutch disk fixed on the shaft and carrying clutch shoes normally engaging the inner surface of the clutch flange, a third disk normally revolving freely with the fixed clutch disk end provided with cam elements, connections between said cam elements and clutch shoes, said cam elements being arranged upon retardation of the third disk to effect release of the shoes from the flange, a brake for the third disk, a trip controlled by the tension in the film, and an operative connection between the trip and the brake.

4. In a motion picture machine employing a film ribbon and having a shutter constantly tending to close; a driving shaft, a clutch disk mounted on said shaft to revolve thereon and having a clutch flange, means connecting said disk and shuttter, a second clutch disk fixed on the shaft and carrying clutch shoes normally engaging the inner surface of the clutch flange, a third disk normally revolving freely with the fixed clutch disk and provided with cam elements, connections between said cam elements and clutch shoes, said cam elements being arranged upon retardation of the third disk to effect release of the shoes from the flange, a brake for the third disk, a trip controlled by the tension in the film, and an operative connection between the trip and the brake and including a lost motion device whereby minor variations in the tension of the film will be ineffective to operate the brake.

5. In a motion picture machine employing a film ribbon and having a shutter normally tending to close; a drive shaft, a clutch disk mounted on said shaft to revolve thereon and having a clutch flange, means to connect the disk and shutter and hold the latter open when the disk tends to revolve in one direction, a second clutch disk fixed to the shaft to revolve therewith, weights mounted on the second disk and movable outwardly under the influence of centrifugal force upon rotation of said second disk, clutch shoes carried by said weights and movable therewith to engage the inner surface of the clutch flange whereby to effect a slipping clutch engagement between said disks, pins projecting from the weights, levers each having one end pivotally connected to the second disk and bearing with their inner sides against said pins, a third disk mounted in axial alinement with the second disk and having cam slots therein, pins carried by said levers and projecting through said cam slots, a brake for the third disk, a trip controlled by the tension in the film, and an operative connection between the trip and the brake.

6. In a motion picture machine employing a film ribbon and having a shutter normally tending to close; a drive shaft, a clutch disk mounted on said shaft to revolve thereon and having a clutch flange, means to connect the disk and shutter and hold the latter open when the disk tends to revolve in one direction, a second clutch disk fixed to the shaft to revolve therewith, weights mounted on the second disk and movable outwardly under the influence of centrifugal force upon rotation of said second disk, clutch shoes carried by said weights and movable therewith to engage the inner surface of the clutch flange whereby to effect a slipping clutch engagement between said disks, pins projecting from the weights, levers each having one end pivotally connected to the second disk and bearing with their inner sides against said pins, a third disk mounted in axial alinement with the second disk and having cam slots therein, pins carried by said levers and projecting through said cam slots, a brake for the third disk, a trip controlled by the tension in the film, and an operative connection between the trip and the brake and including a lost motion device whereby minor variations in the tension of the film will be ineffective to operate the brake.

7. In a motion picture machine employing a film ribbon and having a shutter normally tending to close; a mechanism for holding the shutter open including a clutch having cooperating clutch elements normally engaged, a trip device controlled by the tension of the film, a shaft, a rock arm fixed on said shaft and normally out of engagement with said trip device, said trip device being arranged to move into engagement with and thereafter move the rock arm upon variation outside of limits of the tension in the film, a second rock arm fixed to said shaft, and means controlled by the second rock arm and operating to release the clutch upon movement of the second rock arm.

8. In a motion picture machine employing a film ribbon and having a shutter normally tending to close; a driving shaft, a clutch disk mounted on said shaft to revolve thereon and having a clutch flange, means operatively connecting said disk and shutter, a second clutch disk fixed on the shaft and carrying clutch shoes normally engaging the inner surface of the flange to clutch said disks together, a third disk normally revolving freely with the fixed clutch disk and provided with cam elements, connections between the cam elements and clutch shoes, said cam elements being arranged upon retardation of the third disk to effect release of the shoes from the flange, a trip device controlled by the tension of the film, a second shaft, a rock arm fixed on the second shaft and normally out of engagement with said trip device, said trip device being arranged to move into engagement with and thereafter move the rock arm upon variation outside of limits of the tension in the film, a second rock arm fixed to the second shaft, a brake for the third disk, and an operative connection between the second rock arm and brake.

9. In a motion picture machine employing a film ribbon and having a shutter; of a clutch mechanism comprising a pair of disks, one of said disks carrying a plurality of clutch shoes, the other disk being provided with a flange with the inner face of which the shoes normally engage to clutch said disks together, a connection between the flanged disk and said shutter, a driving element for rotating the shoe carrying disk, a trip controlled by the tension in the film, means actuated by the trip and arranged to disengage the clutch shoes from the flange and thereby release the flanged disk and permit the shutter to close, and a circuit breaker operatively connected to the trip.

10. In a motion picture machine employing a film ribbon and having a shutter; of a clutch mechanism comprising a pair of disks, one of said disks carrying a plurality of clutch shoes, the other disk being provided with a flange with the inner face of which the shoes normally engage to clutch said disks together, a connection between the flanged disk and said shutter, a driving element for rotating the shoe carrying disk, a trip controlled by the tension in the film, means actuated by the trip and arranged to disengage the clutch shoes from the flange and thereby release the flanged disk and permit the shutter to close, said means including a lost motion device whereby minor variations in the tension of said film will be ineffective to release the clutch, and a circuit breaker operatively connected to the trip.

11. In a motion picture machine employing a film ribbon and having a shutter constantly tending to close; a driving shaft, a clutch disk mounted on said shaft to revolve thereon and having a clutch flange, means connecting said disk and shutter, a second clutch disk fixed on the shaft and carrying clutch shoes normally engaging the inner surface of the clutch flange, a third disk normally revolving freely with the fixed clutch disk and provided with cam elements, connections between said cam elements and clutch shoes, said cam elements being arranged upon retardation of the third disk to effect release of the shoes from the flange, a brake for the third disk, a trip controlled by the tension in the film, an operative connection between the trip and the brake, and a circuit breaker operatively connected to the trip.

12. In a motion picture machine employing a film ribbon and having a shutter constantly tending to close; a driving shaft, a clutch disk mounted on said shaft to revolve thereon and having a clutch flange, means connecting said disk and shutter, a second clutch disk fixed on the shaft and carrying clutch shoes normally engaging the inner surface of the clutch flange, a third disk normally revolving freely with the fixed clutch disk and provided with cam elements, connections between said cam elements and clutch shoes, said cam elements being arranged upon retardation of the third disk to effect release of the shoes from the flange, a brake for the third disk, a trip controlled by the tension in the film, an operative connection between the trip and and the brake and including a lost motion device whereby minor variations in the tension of the film will be ineffective to operate the brake, and a circuit breaker operatively connected to the trip.

13. In a motion picture machine employing a film ribbon and having a shutter normally tending to close; a drive shaft, a clutch disk mounted on said shaft to revolve thereon and having a clutch disk, means to connect the disk and shutter and hold the latter open when the disk tends to revolve in one direction, a second clutch disk fixed to the shaft to revolve therewith, weights mounted on the second disk and movable outwardly under the influence of centrifugal force upon rotation of said second disk, clutch shoes carried by said weights and movable therewith to engage the inner surface of the clutch flange whereby to effect a slipping clutch engagement between said disks, pins projecting from the weights, levers each having one end pivotally connected to the said second disk and bearing with their inner sides against said pins, a third disk mounted in axial alinement with the second disk and having cam slots therein, pins carried by said levers and projecting through said cam slots, a brake for the third disk, a trip controlled by the tension in the film, an operative connection between the trip and the brake, and a circuit breaker operatively connected to the trip.

14. In a motion picture machine employing a film ribbon and having a shutter normally tending to close; a drive shaft, a clutch disk mounted on said shaft to revolve thereon and having a clutch flange; means to connect the disk and shutter and hold the latter open when the disk tends to revolve in one direction, a second clutch disk fixed to the shaft to revolve therewith, weights mounted on the second disk and movable outwardly under the influence of centrifugal force upon rotation of said second disk, clutch shoes carried by said weights and movable therewith to engage the inner surface of the clutch flange whereby to effect a slipping clutch engagement between said disks, pins projecting from the weights, levers each having one end pivotally connected to the second disk and bearing with their inner sides against said pins, a third disk mounted in axial alinement with the second disk and having cam slots therein, pins carried by said levers and projecting through said cam slots, a brake for the third disk, a trip controlled by the tension in the film, an operative connection between the trip and the brake and including a lost motion device whereby minor variations in the tension of the film will be ineffective to operate the brake, and a circuit breaker operatively connected to the trip.

In testimony whereof I affix my signature.

CLARENCE E. WRIGHT.